United States Patent [19]

Blom et al.

[11] 4,019,034
[45] Apr. 19, 1977

[54] METHOD FOR DETERMINING THE INTERIOR SHAPE OF SPHERICAL TANKS FOR THE COMPUTATION OF THE LIQUID VOLUME OF THE TANKS, AND DEVICE FOR CARRYING OUT THE METHOD

[75] Inventors: Ole H. Blom, Stabekk; Rolf Bakken, Oslo, both of Norway

[73] Assignee: Bloms Oppmaling A/S, Oslo, Norway

[22] Filed: Oct. 23, 1975

[21] Appl. No.: 624,448

Related U.S. Application Data

[63] Continuation-in-part of Ser. No. 498,731, Aug. 19, 1974, abandoned.

[52] U.S. Cl. .............................. 235/151.3; 73/149
[51] Int. Cl.[2] ................. G06F 15/36; G01F 17/00
[58] Field of Search .............. 235/150, 151, 151.3; 73/149

[56] References Cited

UNITED STATES PATENTS

3,911,257    10/1975    Whitehouse et al. ........... 235/151.3

FOREIGN PATENTS OR APPLICATIONS

1,016,038    1/1966    United Kingdom ............... 235/151
1,016,444    1/1966    United Kingdom ............... 235/151

*Primary Examiner*—Felix D. Gruber

[57] ABSTRACT

For determining the interior shape of spherical tanks for the computation of the liquid volume of the same, the following steps are performed: An arbitrary system of coordinates is established based on field measurements in the tank of a given number of station points within the sphere. From the station points a plurality of reference points in the form of markers affixed to the inner surface of the sphere are identified with reference to said system of coordinates. In the field all the reference points and the inner surface of the sphere are photographed with double coverage for later representation of stereoscopic models in a photogrammetric autograph.

All reference points are later plotted on a drawing sheet in a coordinatograph to establish a horizontal great circle plane of the sphere together with a first interim center of the sphere. A second interim center of the sphere is computed on the basis of said measured reference points and also this computed second interim center is plotted onto the drawing sheet in the coordinatograph. In the autograph stereoscopic models are made using the double coverage photographs and the drawing sheet with the plotted reference points are placed on a drawing table of a coordinatograph associated with the autograph, and both the reference points and further points on the surface of the sphere are read off in the autograph. The readings of said further points are guided along horizontal small circles which have been drawn on the drawing sheet and the actual readings are taken where said small circles are intersected by vertical planes which have been drawn through said second interim center of the great circle. All the coordinate values of the point readings are transferred to an interface unit. In the interface unit, which is connected on line with a computer assembly, the point coordinates are registered and converted into field coordinates, and the registered data in the interface unit are processed in the computer which on the basis of said read reference points and further points calculate the final mean radius of the sphere and lists out the deviation therefrom for every point of reading.

The computer on the basis of said read points also calculate the mean radius of said horizontal small circles for calculating the volume of each of the areas between adjacent small circles to determine the total volume of said tank.

The transfer of coordinate values read in the photogrammetric autograph may take place with a push-button or pedal controlled by an operator, or the reading or transfer of the coordinates to the interface unit may take place at given moments or when the autograph has covered a certain distance along one or more of the coordinate axes thereof.

10 Claims, 7 Drawing Figures

METHOD FOR DETERMINING THE INTERIOR SHAPE OF SPHERICAL TANKS FOR THE COMPUTATION OF THE LIQUID VOLUME OF THE TANKS, AND DEVICE FOR CARRYING OUT THE METHOD

This application is a continuation-in-part of our co-pending application Ser. No. 498,731, filed Aug. 19, 1974 and now abandoned.

BACKGROUND OF THE INVENTION

The present invention relates to a method for determining the interior shape of spherical tanks for the computation of the liquid volume of the tanks. The invention also relates to a combination of apparatus elements used in connection with the carrying out of the method.

It is known to use tanks of spherical shape for transporting liquified natural gas by ship. The determination of the volume of the liquified contents of such tanks requires a measuring method which provides adequate information about the interior shape of the spherical tank, so that from this information it is possible accurately to determine how much the tank at specified points deviates from the spherical form and accurately to compute the quantity of liquid in the tanks.

When coping with large spherical tanks the determination of the interior shape and the volume thereof involves a series of problems because the inner surface of the sphere differs from the theoretical spherical shape. This abberation is due to, inter alia, inaccuracies resulting from the manufacturing process causing bulges on the surface of the sphere, thick joints, possible "insides" of the sphere etc. Besides, the ambient temperature will influence the form and the volume of the spherical tanks, and the spherical tank will also be subjected to deformation due to the load of the contents of the tank.

A further problem which is present in the computation of the liquid volume of spherical tanks on ships is that the tank, apart from deviating from the theoretical spherical shape, turns with the trim of the ship, so that the liquid volume around the inner periphery of the sphere at different trim will cover different spherical areas, the shape of which may deviate from that of the spherical areas covered by the liquid contents of the tanks at zero trim. Besides, the measured length from the bearing plate to the float of the dipping means will be larger for a given volume at a trim value than when the ship is horizontal. Therefore, even if corrections are made both for the displacement to which the dipping means is subjected by trim and the eccentric location of the same along a vertical line, a given volume of liquid will indicate incorrect dipping values for the different trim values because the quantity of liquid is confined by different areas of the spherical tank where the latter may bulge to a larger or lesser degree.

SUMMARY OF THE INVENTION

The present invention has been developed with a view to arriving at a method for accurately determining the interior shape of such spherical tanks and hence determining the volume of the liquid contents of spherical tanks deviating from the theoretical spherical shape, the deviation being caused by "insides" in the sphere, inaccuracies in the manufacturing process, deformation due to variations in temperature, load of the transported quantity and pressure conditions in the tank.

This is achieved by the method according to the invention, which comprises the following sequence of steps:

establishing a predetermined number of measuring stations within the tank;

establishing an arbitrary system of coordinates, the location of said measuring stations being identified with reference to said system of coordinates;

placing a series of markers evenly distributed on the inner surface of the tank to form reference points which are measured by measuring instruments at said measuring stations in accordance with said system of coordinates;

photographing all said reference points to obtain double coverage of all the inner surface areas of the tank;

plotting the measured reference points onto a drawing table of a coordinatograph to establish a horizontal great circle plane of the sphere together with a first interim center of the sphere;

feeding the coordinate values of all reference points and said first interim center of the sphere to a computer for the determination of the coordinate values of a second interim center of the sphere;

plotting said calculated second interim center of the sphere onto said drawing table;

generating a plurality of vertical planes evenly angularly spaced through said second interim center and generating intersecting horizontal circle planes on the drawing table to form selected other points;

forming in an autograph sterescopic models of the inner surface of said tank using the double coverage photographs, said autograph being associated with said coordinatograph with the drawing table;

obtaining a series of three-dimensional readings from said stereoscopic models in a predetermined system of coordinates, said readings including the identification of said reference points and said selected other points on the inner surface of the tank;

transferring all said three-dimensional readings to an interface unit wherein said readings are registered and converted into field coordinates;

calculating on the basis of all three-dimensional readings the final mean radius of the sphere, the coordinate values of the final center of the sphere and the deviation from the mean radius for every point of reading;

calculating on the basis of said three-dimensional readings the mean radius of said small circles; and calculating the volume of each of the areas between adjacent small circles to determine the total volume of said tank.

The manner in which the invention can be carried out, as well as further objects and features of the invention, will be better understood from the following description of a preferred embodiment, in which reference is had to the accompanying drawings.

DETAILED DESCRIPTION OF THE PREFERRED EMBODIMENT

Figure 1:
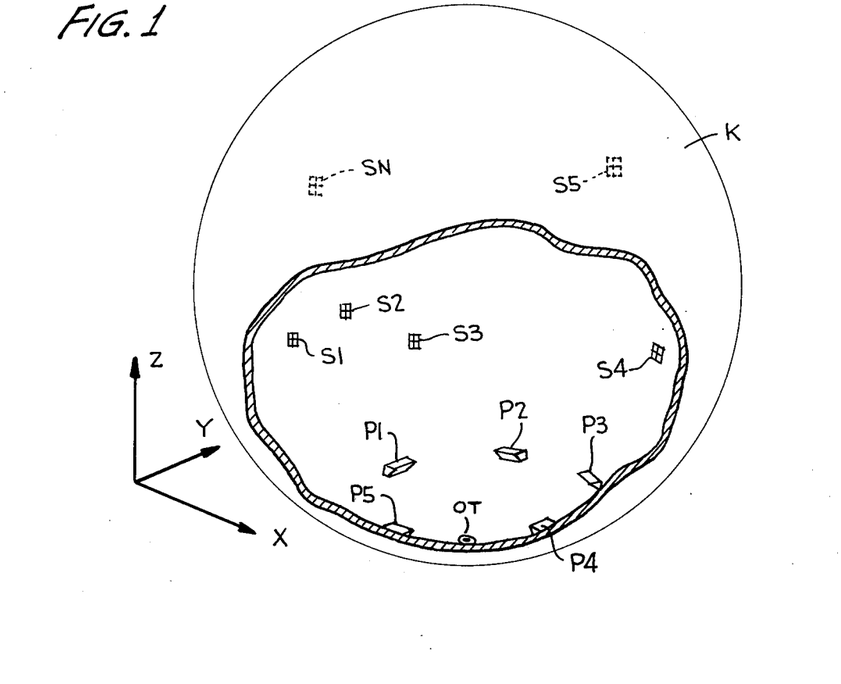
FIG. 1 shows a spherical tank, partly in section, having five inner platforms and a plurality of plastic patches affixed to the inner wall of the sphere.

In FIG. 1 K designates a spherical tank, the interior shape of which is to be measured. The first step in the method for determining the interior shape of the tank is to establish a predetermined number of measuring stations or traverse stations within the tank, from which stations measurements can be carried out in order to establish an arbitrary system of coordinates. As shown in FIG. 1, five platforms or traverse stations P1-P5 are removably attached to the inner wall of the tank. The traverse stations are to be measured as a closed polygonal trace with five sides, and the measurements are made by means of instruments placed on the platforms P1-P5. The platforms are so arranged that the polygone sides do not exceed a certain length, e.g. 12 m, and in tanks having a diameter of approximately 30 m this is achieved by placing the platforms approximately 5 m above the bottom of the tank.

as the traverse lines between the traverse stations P1-P5 are laid out as a closed polygone it is possible to check the accuracy of the field work by computing how nearly the figure closes mathematically. The errors may be distributed according to Bowditch's rule.

The measurements which are taken at a given temperature by means of precision measuring tapes, theodolites and subtense bars will give an accuracy of the polygone sides of 1/10 mm, and the total error of the polygonal trace may thus be kept below +1mm. The instruments used for the measurement of the angle of arc of the polygonal trace may preferably be theodolites of the type "Wild T2 Universal-Theodolit" and subtense bars type "2-m- Basislatte (Invar) Wild GBL" all of which are manufactured by Wild Heerbrugg AG, Switzerland. The accuracy of the subtense bars may be checked by means of a precision tape, e.g. of the type "Lufkin Minvar precision tape" manufactured by Lufkin Europa, The Netherlands, the same type of tape which may be used for measuring distances between the respective stations.

The distance between the stations P1-P2, P2-P3 etc. may preferably be measured by means of surveyor's tape, but may also, of course, be carried out by means of stadia technique, subtense technique, trig-traverse technique or electronic methods.

The lowest point in the tank, which in FIG. 1 is designated OT, is then established by levelling, and with the point OT as a reference the coordinate positions of all stations in the polygonal trace are determined by levelling. The instruments used for the accomplishment of the levelling may preferably be level telescopes of the type "Zeiss Ni 1" and levelling staffs "Zeiss Nivellierlatten" manufactured by Carl Zeiss, Wulertemberg, West-Germany. The points of the platforms or traverse stations are identified with reference to a system of right-angled coordinates, preferably chosen so that the X-axis coincides with the longitudinal axis of the ship and the XY-plane coincides with the horizontal plane. The system of right-angled coordinates may be chose arbitrarily, but for reasons of computation it is preferred to fix the origin outside the tank, so that computation with negative measuring values is avoided. Such a right-angled system of coordinates is indicated to the left in FIG. 1, and it will be further described in the following how the coordinate values are transferred to facilitate the further processing of the data obtained.

As shown in FIG. 1 a plurality of patches S1-SN are adhered to the inner wall of the tank, and on each patch there is depicted a black cross on white bottom. An appropriate number of patches may for example be 70, and the patches are preferably placed along welding seams along the interior of the sphere so as to form a suitable regular pattern. The coordinate positions of each plastic patch S1-SN are established by readings taken from at least three of the polygonal points, i.e. from the traverse stations P1-P5 so as to give overdetermination, and these reference points are also referred to the same system of coordinates as discussed above. The readings for determining the location of the reference points may be carried out by means of the instruments indicated above. The largest permissible deviation in the determination of the reference points may for instance be ±7 mm, and this deviation is checked by the over-determination.

All field measurements from the traverse stations are now completed and the reference points S1-SN are are identified by $x$, $y$ and $z$ coordinate values with reference to the right-angled system of coordinates established by means of the traverse points P1-P5 and the lowest point in the tank OT. These coordinate values will as further described in the following be used for determining a first and a second interim center of the sphere, the determination thereof being accomplished by means of a coordinatograph and a data processing computer, respectively.

The final field work to be accomplished in order to carry out the method according to the invention is photographing the complete inner surface of the sphere with the reference points S1-SN. The surface is photographed by means of a photo-theodolite for later representation of stereoscopic models, and the photographing is therefore accomplished so that double coverage of all the inner areas of the spherical tank will always be maintained. The photographing may be carried out from the platforms P1-P5, but may also be carried out from a scaffold erected approximately at the center of the sphere. In a spherical tank having a diameter of 30 m and with a given type of photo-theodolite, for instance 12 pictures may be suitable for giving double coverage of the complete inner surface of the sphere. If 70 plastic patches are adhered to the inner wall of the sphere and the patches are evenly distributed thereon, each picture will cover approximately 6 patches. A suitable photo-theodolite may for example be of the type "Universalkammer UMK 10/1318" manufactured by VEB Carl Zeiss JENA.

After the measuring and photographing of the sphere have been carried out in the workshop or in the shipyard the data of the measurements and the photographic pictures may be further processed in a laboratory.

Figure 2:
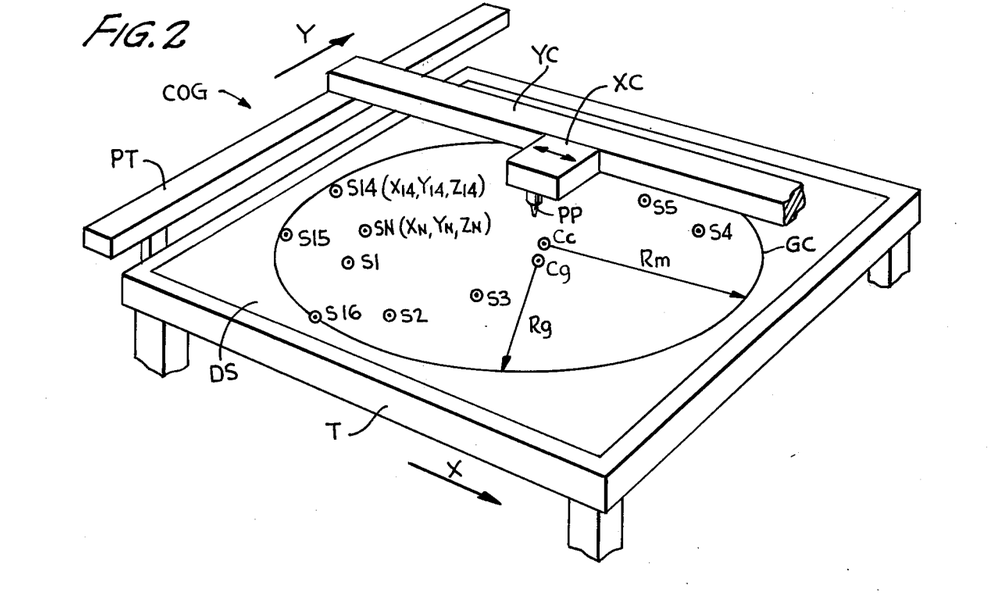
FIG. 2 shows a coordinatograph with a drawing table onto which the coordinate values of the reference points have been plotted.

In the laboratory, the measured reference points are as indicated in FIG. 2 plotted onto a horizontal plane, generally taking the form of a drawing sheet DS placed on the table T of a coordinatograph COG, the measured coordinate values of the reference points thereby being transferred to values which are suitable for the size of the drawing sheet DS. If the diameter of the tank is ca. 30 m and the dimension of the drawing paper is approximately 75 × 75 cm, a scale reduction of 1:50 may be appropriate.

All 70 reference points are plotted on the horizontal X-Y-plane indicated in FIG. 2, however, for the sake of simplicity only a few of these reference points are shown in this figure. The plotting is accomplished by means of a plotting pencil PP which may be lowered by operating means controlled by the operator. The plotting pencil PP is carried by an X-carriage XC which can slide along a Y-carriage YC slidably arranged on two parallel tracks PT only one of which is indicated in FIG. 2. Since the reference points S1-SN were evenly distributed on the inner wall of the sphere, and since the sphere in the region of the horizontal great circle is relatively vertical, an envelope curve GC may be drawn around all the plotted reference points, said envelope curve representing the theoretical horizontal great circle of ths sphere. A first interim center Cg may now be determined graphically on the drawing sheet by drawing appropriate chords and perpendiculars thereon which intersect at the center of the great circle. The coordinate values of the center Cg and the length Rg of the radius of the envelope curve may now be read out in the coordinatograph.

However, since the horizontal great circle GC deviates from the corresponding great circle of the spherical tank due to inaccuracies occuring during the manufacturing process of the tank, it is, for the determination of the interior shape of the spherical tank, practical to calculate the mean radius Rm of the sphere, i.e. that radius which deviates least from the actual values of the radii, and to calculate what coordinate values the center of the sphere must have to give such a mean radius.

This calculation is carried out by the "least squares adjustment" method and the calculation is performed in a data processing computer which stores a program for carrying out this calculation and is fed with the data necessary for the computation.

Figure 3:
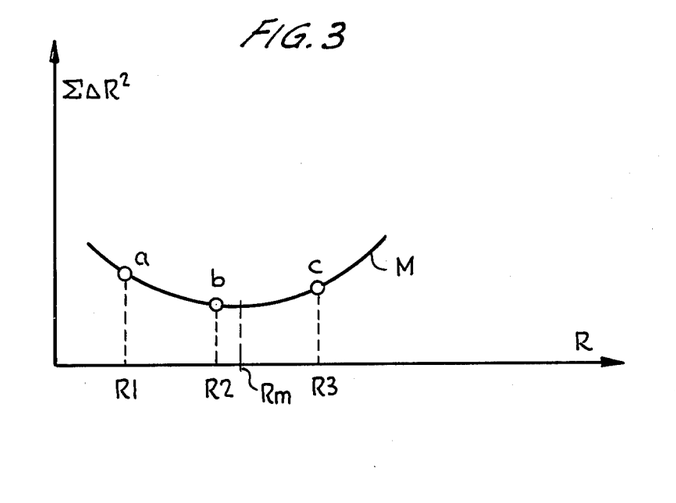
FIG. 3 is a graph illustrating a step in the computation of the mean radius of the sphere.

Part of the computation performed by the computer is graphically illustrated in FIG. 3. The computation illustrated in FIG. 3 is related to the evaluation of the mean radius Rm of the sphere, and the data fed to the computer is besides from the coordinate values of the reference points S1-SN, a selection of e.g. three arbitrarily chosen values of a radius of the sphere, one of these values possibly corresponding approximately to the value of Rg read off in the coordinatograph. In a practical example with a sphere having a diameter of 30 m Rg may be read off to be 15.07 m, and the three values of R fed to the computer may be $R_{CL} = 15.000$, $R_{C2} = 15.000$ and $R_{C3} = 14.500$ m.

For $R_{C1} = 15.500$ the following computation will be accomplished:

$$\Sigma \Delta R_{C1}^2 = \sum_{n=1}^{n=70} [R_n - R_{C1}]^2 = \sum_{n=1}^{n=70} [X_{Cg} - x_n]^2 + [Y_{Cg} - y_n]^2 + [Z_{Cg} - z_n]^2 - R_{C1}^2 \quad (1)$$

These calculations give the sum of the squared deviations from the chosen $R_{C1}$. Since there are 70 reference points 70 calculations are made according to formula (1).

Similar calculations are carried out for $R_{C2} = 15.000$ and $R_{C3} = 14.500$ and the results are for illustrative purposes shown in FIG. 3 as ordinate values a, b and c at R1, R2 and R3, respectively.

To find the mean radius Rm which has the minimum squared deviation sum, a curve M is drawin through the points a, b and c and at the minimum of this curve the radius Rm which gives the least squared deviation is found as the corresponding abcissa value. Of course, the selection of the minimum point of the curve M is automatically performed by the computer and as an example, this mean radius Rm may be 15.05 m.

The next step in the calculation is to determine which coordinate values of the center of the sphere give this minimum squared deviation. The same procedure as described above is then accomplished by the computer, and for the calculation of the x-value of the center three values of this, i.e. $X_1$, $X_2$ and $X_3$ are chosen. One of these values, for example $X_2$, may be equal or approximately to the value corresponding to $X_{Cg}$, which is the x-value of the first interim center Cg of the sphere. The formula for this computation will, for determining the least squared deviation for $X_1$, read as follows:

$$\Sigma \Delta R_{X1} = \sum_{n=1}^{n=70} [X_1 - x_n]^2 + [Y_{Cg} - y_n]^2 + [Z_{Cg} - z_n]^2 - R_m^2 \quad (2)$$

Similar calculations are carried out for $X_2$ and $X_3$ and the results of the calculations are treated as described above in order to establish the x-value which gives the least squared deviation of the mean radius.

Calculations of the corresponding y-values and z-values are carried out in the same manner as previously described.

Now, when all calculations have been completed in order to determine the second calculated interim center of the sphere Cc, this is plotted onto the drawing sheet DS as indicated in FIG. 2.

The interim center Cc of the sphere together with the envelope curve GC forms the basic model of the sphere and this center Cc together with the 70 reference points may give a general and to a certain degree accurate picture of the sphere. However, the 70 referrence points do not generally give enough information to establish reference true and highly accurate picture of the inner surface of the sphere, but the field measurements of the reference points have to be carried out in order to establish an interim model of the sphere as well as obtaining checking points for use during the forthcoming reading process.

In order to obtain further information of the shape of the sphere, the photographic pictures taken of the interior surface of the spherical tank is placed in a photogrammetric autograph for the forming of stereoscopic models. The photogrammetric autograph may preferably be of the type "Universal-Autograph Wild 7"

which is manufactured by Wild Heerbrugg, Switzerland and which is equipped with an associated drawing table onto which the drawing sheet DS with the plotted measured reference points S1-SN and the calculated center Cc of the sphere is placed. However, prior to be placed on the associated drawing table of the autograph the drawing sheet DS has been completed with further details to facilitate the forthcoming reading in the autograph.

Figure 4:
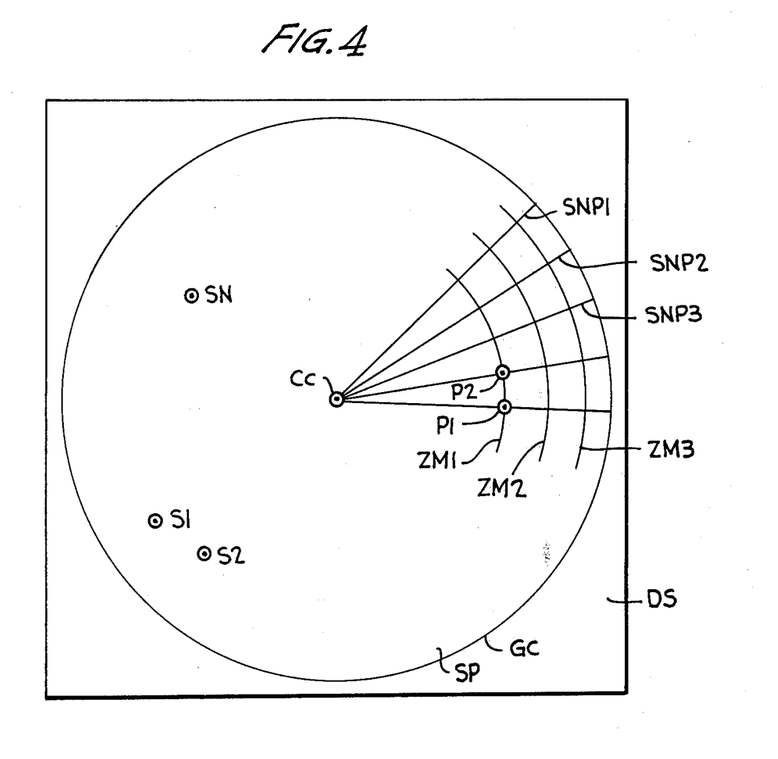
FIG. 4 shows at another scale the projected horizontal great circle surface of the sphere of FIG. 2 onto which a series of reference points are plotted, but onto which several small circles and vertical planes have been added.

As indicated in FIG. 4, the measured reference points S1-SN are still plotted on a horizontal great circle plane SP together with the calculated interim center Cc of the sphere, the center Cc being the interim center computed on the basis of the values of the reference points as described above in detail. Through the center Cc of the great circle plane SP vertical intersectional planes SNP1, SNP2 etc. are placed with a given individual angular spacing $\alpha$ of e.g. 12°, these intersectional planes intersecting a series of small circles ZM1, ZM2 etc., the intersecting points $p1$, $p2$ etc. indicating where it is desired to read off further points on the sphere.

It is to be understood that the coordinate values of the reference points S1-SN plotted on the drawing sheet DS are adapted to the system of coordinates which is determined by the physical dimensions of the autograph, the $x$- and $y$-coordinates being defined by the plane of the drawing table, whereas the $z$-coordinates or levels of the points are added as indexes.

Figure 5:
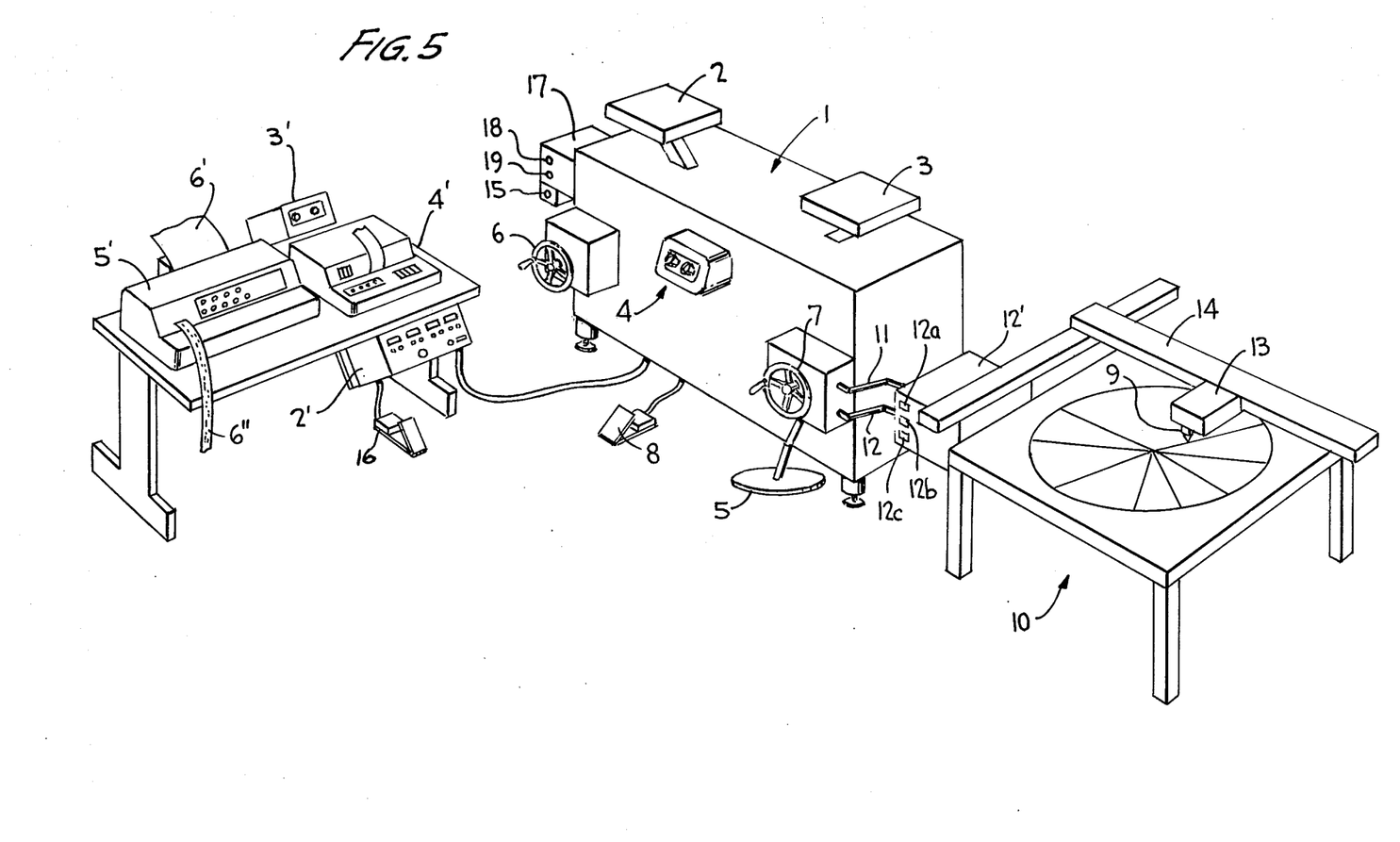
FIG. 5 is a schematical assembly drawing showing the laboratory equipment used to carry out the further procurement and processing of data associated with the determination of the interior shape of the sphere.

In FIG. 5 there is schematically depicted the assembly of laboratory equipment to be used in order to accomplish the further procurement and processing of data associated with the determination of the interior shape of the sphere. In FIG. 5 1 is the general designation of an autograph comprising two picture carriers 2 and 3 which receive negatives or diapositives on film or glass. 4 designates the viewing telescopes through which the operator can observe the stereoscopic model formed by two pictures placed on the picture carriers 2 and 3, respectively. Since the pictures taken have double coverage the two images of the same areas can be viewed stereoscopically, that is, one image is seen with one eye and the other image is seen superimposed with the other eye. In plotting aerial or terrestial photographs the operator sets the elevation by means of a footwheel 5 and traces a contour by turning a handwheel 6 for movement in the X-direction and handwheel 7 for movement in Y-direction. When the elevation's focus is encountered by the floating dot, the operator operates a footswitch 8 which lowers the plotting pencil 9 on an associated drawing or plotting table 10.

The plotting table 10 is connected to the left and right handwheels 6 and 7 via telescoping driveshafts 11 and 12 which via appropriate gear spindles at the plotting table gear box 12' drive the X-carriage 13 and the Y-carriage 14 of the plotting table. It is to be understood that the X-carriage 13 carries the plotting pencil 9 the lowering and lifting of which is effected by the operation of footswitch 8.

It is further to be understood that a detailed description of an autograph is to be found in publications issued by for example "Wild Heerbrugg", Switzerland of which P1 217e-1.75 bearing the title "Wild A10 Autograph" may form part of this specification. Of course, counters from which the $x$-, $y$- and $z$- coordinates can be read, are included with the autograph and may conveniently be built into the gear box 12', as indicated at 12$a$, 12$b$, 12$c$, respectively. It should also be noted that the drawing table 10 associated with the autograph 1 is used as a coordinatograph, and may in all details correspond to the coordinatograph indicated in FIG. 2.

From the S1-SN models in the photogrammetric autograph both the reference points S1-SN and further measuring points on the spherical surface of the tank are read off. The further points are preferably read off along the horizontal small circles which in FIG. 4 are designated ZM, ZM1, ZM2 etc., and the readings are taken at points where the small circles are intersectioned by the vertical sectional planes SNP1, SNP2 etc., i.e. at points $p1$, $p2$ etc.

Figure 6:
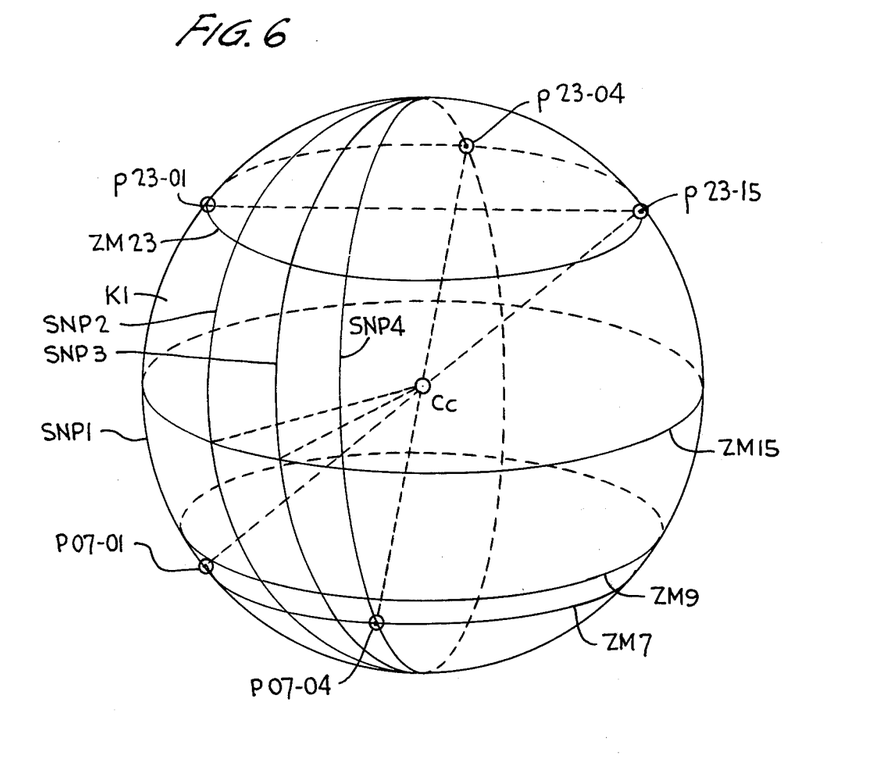
FIG. 6 is a perspective model of a sphere indicating the horizontal small circle planes and the intersecting vertical planes.

In FIG. 6 there is shown a sphere K1 which corresponds to the "sphere" plotted in FIG. 4. In FIG. 6 it is illustrated how readings of diametrically opposite points of the sphere and of the small circles are achieved, readings which facilitates the forthcoming computation of the "shape" of the sphere and of the volume of the sphere. In FIG. 6 readings of diametrically opposite points of the sphere may be taken at p23-04 and at p07-04 or at p23-15 and p07-01. Readings of diametrically opposite points of the small circle ZM23 may be taken at p23-15 and p23-01. The horizontal small circles ZM, ZM1 etc. may have a vertical spacing of approximately 1 m, and if the diameter of the sphere is approximately 30 m, approximately 1 000 points will then be read off from the stereoscopic model. This means that in this case approximately 500 diametrically opposite points or great diameters may be determined by the readings. In the autograph the reference points and the further points are measured with reference to the coordinates of the autograph determined by the physical dimensions of the autograph. These autograph coordinates are, however, easily convertible into the real field coordinates of the sphere, and such conversion may be accomplished before or during the phase of computation as will be described in the following.

As further indicated in FIG. 5, the photogrammetric autograph 1 is connected to an interface unit 2' which is connected to a storage unit 3'. Both the interface unit 2' and the storage unit 3' are connected to a table computer 4'. To the computer 4' there is connected a writer unit 5' of suitable type which may produce a read-out of the measured quantities or the processed measurement results in table form on a sheet 6'.

The interface unit 2' may be of the type "DATAcom 701" manufactured by DATAcom A/S, Norway. A preferred type of storage unit 3' is the type "Hewlett Packard 9865 Casette Memory" manufactured by Hewlett Packard, and the computer 4' may be of the type "Hewlett Packard HP Series 9800/Model 10" also manufactured by Hewlett Packard.

A writer unit 6' to be used may for example be "Model 390 Page Printer" from Data Dynamics.

The interface unit 2' receives coordinate information from the autograph 1. The information is presented from the autograph as autograph coordinates referred to the system of right-angled coordinates of the autograph. These autograph coordinates are accumulated in the registers of the interface and are transferred in a suitable code to the computer 4' and, if a reading out of this information is desired, to the writer unit 5' which will print out the information in clear language on the sheet 6' or on paper tape 6" in coded form.

The interface unit 2' is conveniently provided with four registers, each of which may store a large number of unitary information. Three of the registers are used for X, Y and Z-coordinates, respectively, and the coordinate registers may suitably accumulate units down to a resolution of ±0.01 mm from the photographic picture of the sphere. The fourth register is a numeral register giving a coordinate number with an increment of 1 for each of the collected sets of coordinates. This increment may be varied or kept constant. All the registers may be preset with reference to a desired set of coordinates and a desired coordinate number.

The transfer of the coordinate information of each sample point selected in the autograph may be accomplished in various ways. For instance a set of autograph coordinates or photograph coordinates may be transferred to the interface unit 2' by means of a pedal or a pushbutton connected to the interface unit. In FIG. 5 a pushbutton is indicated at 15 and a pedal at 16. The transfer of information may also be carried out in fixed time intervals which may be preset on a desired value. Besides, a third method of transfer may be based on the sampling distance covered by the autograph along one of the coordinate axes or on the sum of the distances along every two coordinate axes. This distance may be set by means of appropriate setting buttons. In FIG. 5. a unit 17 is indicated with a first dial 18 for the setting of time intervals between each reading and a second dial 19 for the setting of the distance between each reading.

The data registered in the interface unit 2' in the manner described above may be transferred directly to the computer 4' or to the store 3' which includes a suitable storing medium, e.g. magnetic tapes or the like. The interface unit 2' makes it possible at the same time as the registration of information from the autograph is taking place, to allow the already registered information transferred to the computer 4' via the interface unit 2', to be processed by the computer. The result of this processing or computation may be written out in clear language in table form at the same time as the registration of information from the autograph is taking place. The registers of the interface unit 2' may be cancelled or preset according to wish, for instance at the commencement of a new series of measurements.

On the basis of the 70 reference points and the additional 1,000 points another, final center CF of the sphere is calculated. This is done following the same procedure as described in connection with the computation of the interim center Cc, i.e. in this case three new values of the radius is chosen, for example $R_{C4}$, Rm and $R_{C5}$, and the calculation of the sum of the squared deviation from Rm is given for $R_{C4}$, respectively, according to the following formula:

$$\Sigma \Delta R_{C4}^2 = \sum_{n=1}^{n=1070} [R_n - R_m]^2 \quad (3)$$

The final mean radius will then be RmF and the coordinates corresponding to a center CF giving this final mean radius is calculated and designated for example XCF, YCF and ZCF.

Figure 7:
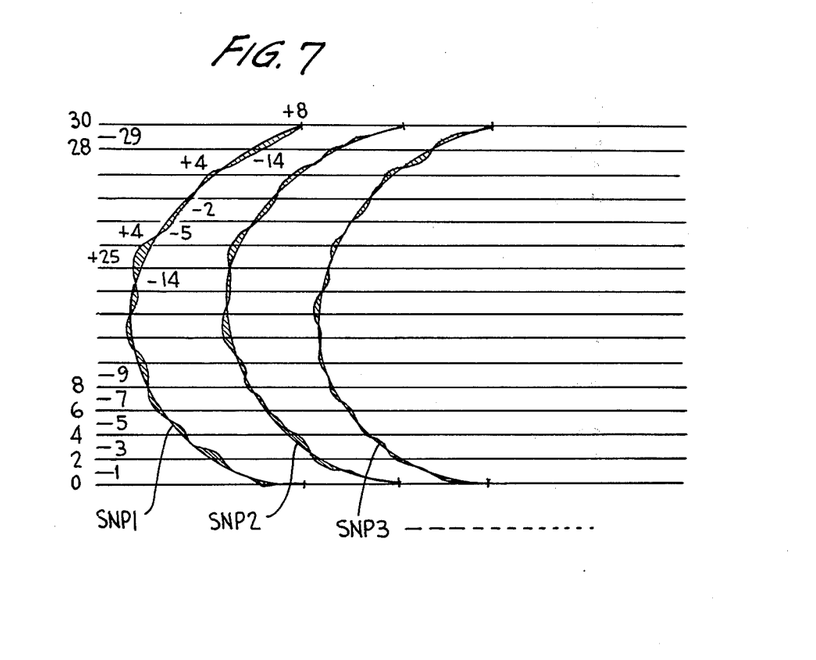
FIG. 7 shows graphs indicating the deviations from the final mean calculated radius of the sphere along the vertical circles of the sphere.

The computer is now switched to a program for listing out the deviation between the final mean radius RMF and the respective radii measured in the autograph for all 1070 points. If these deviations are plotted along their respective vertical circles, i.e. along the periphery of the intersecting planes SNP1, SNP2 etc., a diagram as indicated in FIG. 7 may be produced. In FIG. 7 the horizontal lines are numbered from 0 to 30 indicating the spacing of 1 meter between the adjacent small circle planes ZM1, ZM2 etc. and the profiles designated SNP1, SNP2 etc. indicate the contours of the vertical sections through the sphere. The hatched areas indicate deviations from the mean radius RmF and may at the intersection points with the horizontal planes be completed by numbers indicating the actual deviation values.

From the computations and the graphs it can easily be verified the maximum and minimum diameter of the spherical tank, and these values are of importance to the official supervising authorities which are setting an upper limit for the difference between these extremeties. In Norway, for example, the difference between maximum and minimum diameter must not exceed 5 °/00.

Of course, the number of readings taken in the autograph may be increased substantially above 1200, but the establishment of approximately 30 intersecting planes for a sphere of 30 meter diameter is regarded as sufficient. Also, the distance between every horizontal plane ZM, ZM1 etc. may be decreased in order to increase the number of intersecting points between the horizontal and vertical planes. Of course, when the size of the tank is increased also the number of readings will be increased.

The calculation of the volume carried out in the computer 4' is not accomplished for the sphere as a whole, but the computer is programmed to calculate the mean radius of the small circles on the basis of the values of the points located on the respective horizontal small circles, and, if desired, the areas of these small circles are used to compute the volume of the spherical tank for every meter up the tank. In the listed table of the volume there are interpolated quantities of volume for every cm height in the tank.

The computation of the volume of spherical segments of the sphere formed by intersection of two parallel planes is given either by the formula:

$$V = \frac{\pi h}{6} (3r_1^2 + 3r_2^2 + h^2) \quad (4)$$

where $r_1$ and $r_2$ are the radii of the two base circles, or by the prismoidal formula:

$$V = \frac{h}{6} (B_1 + 4M + B_2) \quad (5)$$

where $B_1$, $B_2$ denote the areas of the two bases, and M the area of the midsection halfway between the bases, the first of these formulas (4) being preferred.

On the basis of the accomplished volume computation, calibration tables are written out by the writer unit 5'. If the sphere would have the theoretical spheric shape and were dipped along an axis which was always vertical through the center of the sphere one table would have been correct for any trim value of the ship. These assumptions are, however, not met in practice. The tank is not completely spherical and the dipping will usually be carried out along a line which is parallel to, but eccentric with respect to the axis of the sphere. This entails that at different trim values of the ship the zero point of the dipping will change level relative to the bottom of the sphere, and the measured length from the bearing plate to the float will always be larger for a given volume at trim than when the ship is horizontal. A given quantity of volume will, even if the two above-mentioned conditions are corrected, show incorrect dipping values at different trim values because the quantity of liquid in the tank will fill different parts of the sphere dependent on the position of the sphere.

However, the tilting of the spherical tank entails that some of the measured points of the "zero" horizontal circles are lifted and some lowered. Some of these points will coincide with new circles which are parallel to the surface of the water level, such coinciding points being used to calculate the mean radius of tha parallel circles. After having determined the mean radius of the new set of parallel circles, the volume is calculated according to formula (4) above.

Thus, the above-mentioned conditions are taken into consideration by the listing of the calibrating tables, the tables being listed for different trim values. At the same time as regard is had to subtractions or additions in volume occasioned by insides in the sphere, bulges on the surface of the sphere, also deformation due to temperature variations as well as the load of the liquid volume and the pressure conditions in the tank can be taken into account when listing out the tables.

What we claim are:

1. A method for determining the interior shape of a spherical tank for the computation of the liquid volume of the tank, comprising the steps of:
   establishing a predetermined number of measuring stations within the tank;
   establishing an arbitrary system of coordinates, the location of said measuring stations being identified with reference to said system of coordinates;
   placing a series of markers evenly distributed on the inner surface of the tank to form reference points which are measured by measuring instruments at said measuring stations in accordance with said system of coordinates;
   photographing all said reference points to obtain double coverage of all the inner surface areas of the tank;
   plotting the measured reference points onto a drawing table of a coordinatograph to establish a horizontal great circle plane of the sphere together with a first interim center of the sphere;
   feeding the coordinate values of all reference points and said first interim center of the sphere to a computer for the determination of the coordinate values of a second interim center of the sphere;
   plotting said calculated second interim center of the sphere onto said drawing table;
   generating a plurality of vertical planes evenly angularly spaced through said second interim center and generating intersecting horizontal circle planes on the drawing table to form selected other points;
   forming in an autograph stereoscopic models of the inner surface of said tank using the double coverage photographs, said autograph being associated with said coordinatograph with the drawing table;
   obtaining a series of three-dimensional readings from said stereoscopic models in a predetermined system of coordinates, said readings including the identification of said reference points and said selected other points on the inner surface of said tank;
   transferring all said three-dimensional readings to an interface unit wherein said readings are registered and converted into field coordinates;
   calculating on the basis of all three-dimensional readings the final mean radius of the sphere, the coordinate values of the final center of the sphere and the deviation from the mean radius for every point of reading;
   calculating on the basis of said three-dimensional readings the mean radius of said small circles; and
   calculating the volume of each of the areas between adjacent small circles to determine the total volume of said tank.

2. A method as in claim 1, wherein the arbitrary system of coordinates is a right-angled system of coordinates, the origin of which is positioned outside the sphere.

3. A method as in claim 1, wherein the lowest point of the spherical tank is chosen as origin and as reference for said reference points.

4. A method as in claim 1, wherein the coordinate values of every reference point is determined by measurements from at least three measuring stations.

5. A method as in claim 1, wherein the photographing of the reference points is accomplished from the measuring stations and from a scaffolding unit arranged at the middle of the sphere.

6. A method as in claim 1, wherein the reading of an intersecting point between a horizontal small circle plane and a vertical plane is followed by the reading of a diametrically opposite point.

7. A method as in claim 1, wherein the computation of the second interim and the final center of the sphere is calculated by means of the "least squares adjustment" method.

8. A method as in claim 1, further comprising the step of controlling the transfer of said three-dimensional readings to said interface unit.

9. A method as in claim 8, wherein said three-dimensional readings are transferred at predetermined times.

10. A method as in claim 8, wherein said three-dimensional readings are transferred to said interface unit when a certain distance along one or more of the coordinate axes of the stereoscopic model has been traversed.

* * * * *